United States Patent [19]
Gittinger

[11] 3,781,718
[45] Dec. 25, 1973

[54] HYBRID BAND PASS-BAND STOP FILTER

[75] Inventor: Norman C. Gittinger, Schenectady, N.Y.

[73] Assignee: General Electric Company, Schenectady, N.Y.

[22] Filed: Jan. 2, 1973

[21] Appl. No.: 320,358

[52] U.S. Cl. .................... 333/11, 333/70 R, 333/75, 333/77
[51] Int. Cl. .......................... H03h 7/04, H03h 7/14
[58] Field of Search ...................... 333/70 R, 75, 77, 333/11, 6

[56] References Cited

UNITED STATES PATENTS

| | | | |
|---|---|---|---|
| 2,115,138 | 4/1938 | Darlington | 333/77 X |
| 3,089,004 | 5/1963 | Oswald | 333/11 X |
| 3,593,209 | 7/1971 | Gittinger | 333/11 |

OTHER PUBLICATIONS

Sheffield–"Filter Design Simplified" in Audio Engineering March 1951; pages 13–14, 34–36.
Sheffield–"Filter Design Simplified" in Audio Engineering May 1951; pages 26,28,58.

*Primary Examiner*—James W. Lawrence
*Assistant Examiner*—Marvin Nussbaum
*Attorney*—Louis A. Moucha et al.

[57] ABSTRACT

A hybrid filter having the characteristics of a hybrid coupler and band pass and band stop filters combined. The hybrid filter provides a band pass port and a band stop port to which a number of frequency filters are connected. A predetermined frequency range of a spectrum of frequencies applied to the hybrid filter is isolated and confined to the band pass port. The frequencies other than the band pass frequency range are transmitted to the band stop port. The hybrid filter provides a constant impedance at all frequencies by employing reactive elements of critical values. A high attenuation exists at all frequencies between the band pass and band stop ports.

15 Claims, 6 Drawing Figures

HYBRID BAND PASS-BAND STOP FILTER

BACKGROUND OF THE INVENTION

1. Field of the Invention

This invention relates to wave transmission networks and more particularly to hybrid band pass-band stop filters which separate one frequency band from a spectrum of frequencies.

2. Description of Prior Art

In communication systems a great number of messages are frequently sent over a single transmission line. These messages may be transmitted in two directions simultaneously, and generally each message has its own particular frequency or band of frequencies for transmission. When one of these messages is to be intercepted and used, it is necessary to employ a device which separates the frequency band carrying that message from the spectrum of frequencies. In other circumstances, it is necessary to separate certain frequency bands so that they may be amplified and then recombined with the remaining spectrum of frequencies for further transmission along the transmission line. Hybrid band pass-band stop filters are devices which will accomplish frequency band separation or which will combine frequency bands with a spectrum of frequencies. Hybrid band pass-band stop filters must isolate the frequency band from the spectrum of frequencies so as to avoid inducing adverse effects in the frequency band or spectrum of frequencies.

Hybrid band pass-band stop filters can be connected in networks when, for example, a number of frequency bands are desired to be separated from the frequency spectrum or when a certain frequency band is to be amplified. Amplifiers are usually employed in these networks; this could result in closed loops having a gain greater than one at certain frequencies. A closed loop having a gain greater than one causes oscillations in the communication system and destroys effective signal transmission. Closed loops having a gain greater than one may be prevented by employing coupling devices which have a high attenuation at all frequencies between the band pass and band stop ports.

Another desirable characteristic of a communication system is that the impedance of all the constituent elements match, that is, be of the same value. With impedance matching, maximum power is transferred through the communication system, and the need for amplifying stations is reduced.

The present invention is a modification of the hybrid crossover filter disclosed in U.S. Pat. No. 3,593,209, assigned to the assignee of the present invention. That patent discloses a hybrid filter which separates or divides a spectrum of frequencies at a crossover frequency into a low frequency range and a high frequency range. Improvement of the hybrid crossover filter disclosed in the aforementioned patent is also the subject of copending applications, Ser. Nos. (320,009 ) and (320,010 ), having the same filing date as this application and assigned to the assignee of the present invention. These copending applications involve employing different circuit elements to secure a reduction in cost and an improvement in performance while maintaining the capability of separating low frequencies from high frequencies at the crossover frequency.

The present invention comprises a hybrid band pass-band stop filter employing an arrangement of filter means to effectively separate a predetermined frequency band from a spectrum of frequencies. The present invention isolates the frequency band from the spectrum of frequencies, and employs elements of critical values to provide a constant input impedance at all frequencies equal to the characteristic impedance of the transmission line. This constant impedance is provided at all filter ports.

SUMMARY OF THE INVENTION

It is an object of this invention to provide a hybrid filter having band pass and band stop characteristics which separates a range of frequencies extending from a low crossover frequency to a high crossover frequency from a spectrum of frequencies.

It is a further object of this invention to provide a hybrid band pass-band stop filter having a constant input impedance at all frequencies equal to the characteristic impedance of a transmission line to which the hybrid filter is adapted to be connected. This constant impedance is provided at all filter ports.

It is another object of this invention to provide a hybrid band pass-band stop filter exhibiting high attenuation between the band pass and band stop ports and also between the two common ports.

To accomplish these and other objects, the present invention, in one form thereof, comprises a hybrid filter having a band pass filter means, a band stop filter means, and a complementary filtering and phase inversion means. The complementary filtering and phase inversion means operates in conjunction with the band pass and band stop filter means to cancel the effect of undesired frequencies on the performance of the hybrid filter with a resulting high separation and isolation of a predetermined frequency range from a spectrum of frequencies. The values of the elements employed make the input impedance of the hybrid filter constant at all frequencies and equal to the characteristic impedance of a transmission line to which the hybrid filter is to be connected while further providing high power isolation.

BRIEF DESCRIPTION OF THE DRAWINGS

A more complete understanding of the invention may be had by referring to the accompanying detailed description and drawing in which.

DETAILED DESCRIPTION OF THE INVENTION

Figure 1:
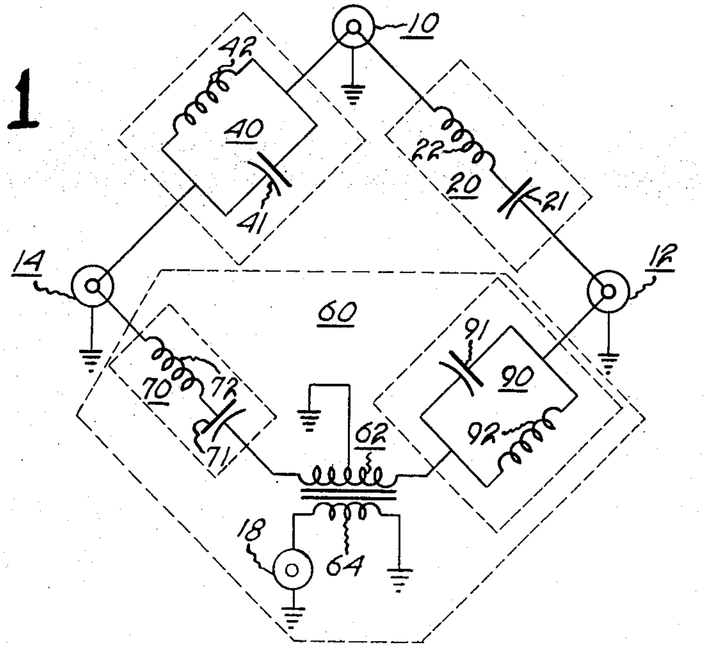
FIG. 1 is a schematic diagram of one embodiment of the hybrid band pass-band stop filter comprising the present invention.

One embodiment of the hybrid band pass-band stop filter is shown in FIG. 1. There, a first band pass filter means 20 electrically connects a first common port 10 and a band pass port 12, and a first band stop filter means 40 electrically connects the first common port 10 and a band stop port 14. A complementary filtering and phase inversion means 60 electrically connects the band pass port 12 and the band stop port 14. The complementary filtering and phase inversion means includes a second band pass filter means 70, a second band stop filter means 90, and a means for phase inverting frequencies, such as a center-tapped inductor 62. The center-tapped inductor 62 is electrically connected between the second band pass filter means 70 and the second band stop filter means 90 to form a series circuit between the band pass port 12 and the band stop port 14. The second band pass filter means 70 and the second band stop filter means 90, both a part of the series circuit, are connected to the band stop port 14 and the band pass port 12, respectively. The center-tapped inductor 62 also contains a means of coupling to a second common port 18, such as the magnetically coupled secondary winding 64. Alternatively, the secondary winding (and second common port) could be replaced by a loading resistor of resistance 4R connected across the center-tapped inductor to thereby form a three-port hybrid filter.

Due to the symmetry of the circuits disclosed herein, the selection of the input port 10 is arbitrary. Any port could be the input port. For example, port 12 could be labeled the input port, and in this case port 18 would be the band stop port, port 10 the band pass port, and port 14 the second common port.

The first band pass filter means 20 has a band pass frequency response for transmitting a range of frequencies from a low crossover frequency to a high crossover frequency. This frequency response characteristic is obtained by connecting a capacitor 21 and an inductor 22 in series. The capacitor 21 exhibits great impedance at low frequencies to inhibit transmission of low frequencies and the inductor 22 exhibits great impedance at high frequencies to inhibit transmission of high frequencies. At frequencies in the range between the low crossover frequency and the high crossover frequency, the impedances of the capaticor 21 and inductor 22 counteract one another to allow ready transmission of the range of frequencies from the low crossover frequency to the high crossover frequency. The second band pass filter means 70 similarly includes a capacitor 71 and an inductor 72 connected in series. The band pass frequency response of the second band pass filter means 70 is substantially identical to the band pass frequency response of the first band pass filter means 20. The range of frequencies between the low crossover frequency and the high crossover frequency which the first and second band pass filter means readily transmits is predetermined by the value of the inductors and capacitors employed.

The first band stop filter means 40 includes a capacitor 41 and an inductor 42 connected in parallel. The first band stop filter means 40 transmits all frequencies except the range of frequencies transmitted by the first or second band pass filter means. That is, it has a band rejection frequency response which inhibits transmission of frequencies between the low crossover frequency and the high crossover frequency and allows ready transmission of frequencies less than the low crossover frequency and frequencies greater than the high crossover frequency. This frequency response characteristic is a result of values of the capacitor 41 and the inductor 42. Low frequencies are readily transmitted by the inductor 42 and high frequencies are readily transmitted by the capacitor 41. At frequencies falling within the range of frequencies from the low crossover frequency to the high crossover frequency, the capacitor 41 and inductor 42 both exhibit significant impedance to inhibit the transmission of this frequency band. The second band stop filter means 90 includes a capacitor 91 and inductor 92 connected in parallel, and the second band stop filter means 90 has a band rejection frequency response substantially identical to the band rejection frequency response of the first band stop filter means 40.

Figure 2:
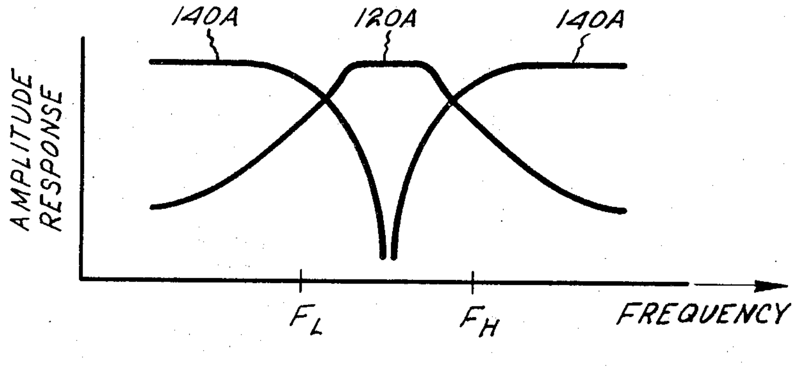
FIG. 2 is a graph of the amplitude response versus frequency characteristics of the hybrid band pass-band stop filter of FIG. 1.

In FIG. 2 the band pass frequency response of the band pass filter means 20 and 70, each formed by an inductor and a capacitor connected in series, is shown by curve 120A. Curve 140A illustrates the band rejection frequency response of the band stop filter means 40 and 90, each formed by an inductor and capacitor connected in parallel. The band pass frequency response curve 120A illustrates that frequencies from the low crossover frequency $F_L$ to the high crossover frequency $F_H$ are of high amplitude indicating that they are readily transmitted by the band pass filter means. The band rejection frequency response curve 140A illustrates that frequencies less than the low crossover frequency and frequencies greater than the high crossover frequency are of high amplitude indicating that they are readily transmitted by the band stop filter means.

The complementary filtering and phase inversion means 60 of FIG. 1 further includes a second common port 18 electrically connected to a secondary winding 64 of the center-tapped inductor 62. The secondary winding 64 receives the induced electrical signals passing through the center-tapped inductor 62 and makes these induced electrical signals available for circuit use at the second common port 18. The center-tapped inductor 62 is wound for phase inversion of certain undesired frequencies which may adversely effect the performance of the hybrid filter. The operation of the second band pass filter means 70, the second band stop filter means 90, and the center-tapped inductor 62 insures that the filtering and phase inversion means 60 will reduce or cancel the effect of the undesired frequencies on the performance of the hybrid filter, as can be understood from the following description of operation.

The hybrid band pass-band stop filter of FIG. 1 operates as follows. A signal having a spectrum of frequencies is applied to the first common port 10. The first band pass filter means 20 transmits the frequencies falling within the range from the low crossover frequency to the high crossover frequency to the band pass port 12, while inhibiting transmission of frequencies falling outside this frequency range. The first band stop filter means 40 transmits the spectrum of frequencies which excludes the frequency range transmitted by the band pass filter means 20 to the band stop port 14. In operation, the hybrid band pass-band stop filter thus far described separates the frequency range extending from the low crossover frequency to the high crossover frequency from the spectrum of frequencies and acts as an impedance to isolate this frequency range from the frequency spectrum.

The hybrid band pass-band stop filter further acts to eliminate the effect of undesired frequencies. The undesired frequencies at the band pass port are those frequencies outside the range of frequencies transmitted by the first band pass filter means 20, and the undesired frequencies at the band stop port are those frequencies falling within the range of frequencies rejected by the first band stop filter means 40. The effect of the undesired frequencies is reduced by the complementary filtering and phase inversion means 60. For example, consider a signal containing a full spectrum of frequencies applied to the first common port 10. The range of frequencies transmitted by the first band pass filter means 20 are directed to the band pass port 12, and the remaining frequencies are directed to the band stop port 14. However, should an undesired frequency be inadvertently transmitted by the first band pass filter means 20, the same undesired frequency will be transmitted by the second band pass filter means 70 because both means have substantially identical band pass frequency response characteristics and the first band stop filter means 40 readily transmits this undesired frequency between ports 10 and 14. The undesired frequency is phase inverted by the center-tapped inductor 62 and readily transmitted by the second band stop filter means 90 to the band pass port 12. The phase inverted undesired frequency and the undesired frequency partially cancel at the band pass port 12 to reduce the effect of the undesired frequency.

Similarly, if an undesired frequency is inadvertently transmitted by the first band stop filter means 40, the same undesired frequency is readily transmitted by the second band stop filter means 90 because both means have substantially identical band rejection frequency response characteristics and the first band pass filter means 20 readily transmits this undesired frequency between ports 10 and 12. The undesired frequency is phase inverted by the center-tapped inductor 62 and readily transmitted by the second band pass filter means 70 to the band stop port 14. Partial cancellation of the phase inverted undesired frequency and the undesired frequency at the band stop port 14 reduces the effect of the undesired frequency.

When the hybrid band pass-band stop filter is used to couple a frequency range onto a single transmission line, the effect of undesired frequencies is similarly eliminated. For example, consider an undesired frequency present at the band pass port 12 which could result from harmonics of an amplifier to which the band pass port 12 is connected. The undesired frequency is readily conducted by the second band stop filter means 90 to the phase inverting center-tapped inductor 62 and second common port 18. Should the undesired frequency be inadvertently transmitted through the first band pass filter means 20, the phase inverted undesired frequency will be similarly transmitted through the second band pass filter means 70. The first band stop filter means 40 then readily conducts either the undesired frequency or the phase inverted undesired frequency between the ports 10 and 14 to cancel the effect of the undesired frequency at the band stop port 14 and reduce its effect at the first common port 10.

Similarly, should an undesired frequency be present at the band stop port 14, it will be readily transmitted through the second band pass filter means 70 and phase inverted by the center-tapped inductor 62. Should the undesired frequency be indavertently transmitted through the band stop filter means 40, the phase inverted undesired frequency will be similarly transmitted through the second band stop filter means 90. The band pass filter means 20 readily transmits either the undesired frequency or the phase inverted undesired frequency between the ports 10 and 12 to cancel the effect of the undesired frequency at the band pass port 12 and reduce its effect at the common port 10.

The cancellation property of the band pass-band stop hybrid filter is effective at all frequencies. All frequencies applied to the band stop port 14 are cancelled at the band pass port 12. All frequencies applied to the band pass port 12 are cancelled at the band stop port 14. All frequencies applied to the first common port 10 are cancelled at the second common port 18. All frequencies applied to the second common port 18 are cancelled at the first common port 10. This is a primary feature of this filter as well as the filters described in the concurrently filed applications Ser. Nos. (320,009 ) and (320,010 ).

The preceding description of the hybrid band pass-band stop filter of FIG. 1 readily illustrates how the arrangement of circuit elements acts to separate and isolate the frequency range extending from the low crossover frequency to the high crossover frequency from the spectrum of frequencies, and to reduce or eliminate the effect of undesired frequencies. In addition to frequency filtering, the hybrid band pass-band stop filter has a constant input impedance at all frequencies equal to the characteristic impedance of the transmission line to which the hybrid band pass-band stop filter is adapted to be connected. This input impedance is constant at all ports. The input impedance is constant at all frequencies if critical values of circuit elements are employed and the following requirements are met. For other symmetrical values of the circuit elements, the input impedance is not necessarily constant at all frequencies, but the other desirable filter characteristics described hereinabove are maintained. A transmission line or impedance equal to the value of the characteristic impedance of the transmission line must be connected to each port of the hybrid band pass-band stop filter. Capacitors 21 and 71 must be of value $C_S$ and capacitors 41 and 91 must be of value $C_P$. Inductors 22 and 72 must be of value $L_S$ and inductors 42 and 92 must be of value $L_P$ $C_S$, $C_P$, $L_S$ and $L_P$ are related by the following formulas:

$$C_S = (F_H - F_l)/(F_H \cdot F_L) \cdot 1/(2\pi R \sqrt{2})$$

$$C_P = 1/[2\pi R \sqrt{2} (F_H - F_L)]$$

$$L_S = [R \sqrt{2}/2\pi (F_H - F_L)]$$

$$L_P = (F_H - F_L)/(F_H \cdot F_L) \cdot (R \sqrt{2}/2\pi)$$

where $F_L$ is the low crossover frequency, $F_H$ is the high crossover frequency, and R is the value of impedance characteristic of the transmission lines to which the filter is adapted to be connected.

Figure 3:
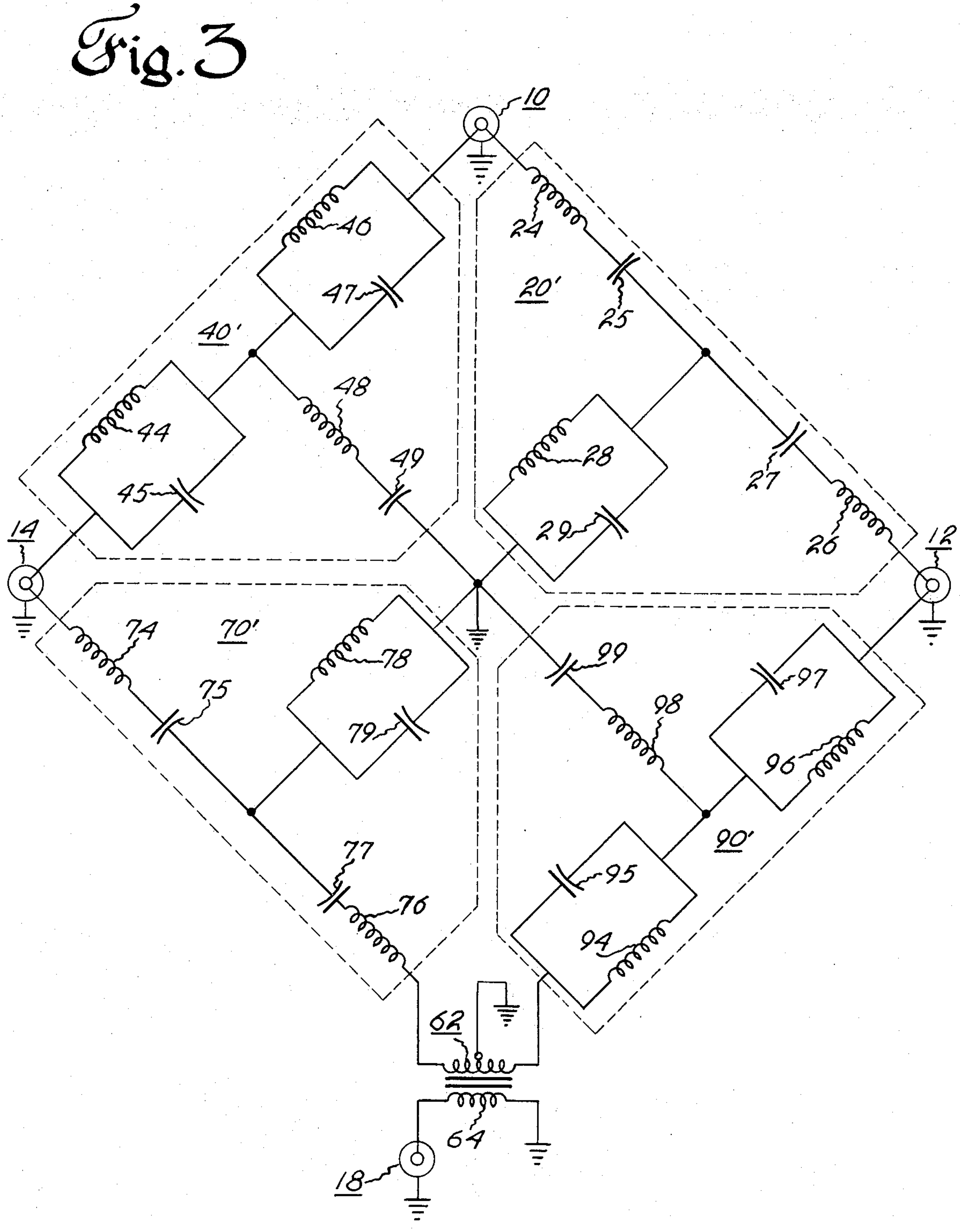
FIG. 3 is a schematic diagram of a modified version of the hybrid filter of FIG. 1.

Another embodiment of the invention is shown in FIG. 3. This embodiment incorporates filters which are more complex than the filter means shown in FIG. 1. In FIG. 3, the first and second band pass filter means 20′ and 70′, respectively, each comprises band pass T filters. Each band pass T filter has two series branches and a shunt branch. The band pass T filter of the first band pass filter means 20′ has one series branch formed by an inductor 24 and a capacitor 25 connected in series, and the other series branch formed by an inductor 26 and a capacitor 27 connected in series. The shunt branch of this T filter is formed by an inductor 28 and a capacitor 29 connected in parallel. The band pass T filter of the second band pass filter means 70′ similarly includes two series branches and a shunt branch, with one series branch formed by an inductor 74 and a capacitor 75 connected in series, the other series branch formed by an inductor 76 and a capacitor 77 connected in series, and a shunt branch formed by an inductor 78 and a capacitor 79 connected in parallel.

The first and second band stop filter means 40' and 90', respectively, comprise band stop T filters, and each band stop T filter has two series branches and a shunt branch. The band stop T filter of the first band stop filter means 40' has one series branch formed by an inductor 44 and a capacitor 45 connected in parallel, the other series branch formed by an inductor 46 and capacitor 47 connected in parallel, and the shunt branch formed by an inductor 48 and capacitor 49 connected in series. Similarly, the band stop T filter of the second band stop filter means 90 has one series branch formed by an inductor 94 and capacitor 95 connected in parallel, the other series branch formed by an inductor 96 and capacitor 97 connected in parallel, and the shunt branch formed by an inductor 98 and capacitor 99 connected in series.

Figure 4:
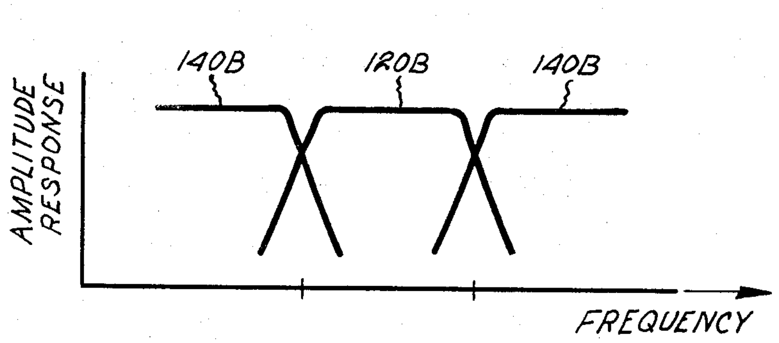
FIG. 4 is a graph of the amplitude response versus frequency characteristics of the hybrid band pass-band stop filter illustrated in FIG. 3.

The more complex band pass filter means and band stop filter means described in FIG. 3 provide a hybrid band pass-band stop filter having the amplitude response versus frequency characteristics seen in FIG. 4. The band stop T filters provide a band rejection frequency response graph 140B which indicates great attenuation of those frequencies falling in the range from the low cross-over frequency $F_L$ to the high crossover frequency $F_H$. The band pass T filters provide the band pass frequency response curve 120B indicating ready transmission without attenuation of the range of frequencies from the low crossover frequency $F_L$ to the high crossover frequency $F_H$.

The hybrid band pass-band stop filter of FIG. 3 operates in the same manner as the filter described in FIG. 1. The filter of FIG. 3 also acts to isolate the range of frequencies extending from the low crossover frequency to the high crossover frequency from the spectrum of frequencies, and to reduce or eliminate the effect of the undesired frequencies. In addition, the hybrid band pass-band stop filter of FIG. 3 has a constant input impedance equal to the characteristic impedance of the transmission line to which the hybrid filter is adapted to be connected. The input impedance at all parts is constant at all frequencies if critical values of circuit elements are employed and the following requirements are met. A transmission line or an impedance equal to the value of the characteristic impedance of the transmission line must be connected to each port. Inductors 24, 26, 74 and 76 must be of values $L_S$, and inductors 28 and 78 must be of value $KL_P$. Capacitors 25, 27, 75 and 77 must be of value $C_S$, and capacitors 29 and 79 must be of value $C_P/K$. Inductors 44, 46, 94 and 96 must be of value $L_P$, and capacitors 45, 47, 95 and 97 must be of value $C_P$. Inductors 48 and 98 must be of value $KL_S$ and capacitors 49 and 99 must be of value $C_s/K$. $L_S$, $C_S$, $L_P$ are related by the following formula:

$$L_S = R \sqrt{[2.4516316]}/[2\pi (F_H - F_L)]$$

$$C_S = (F_H - F_L)/(F_H \cdot F_L) \cdot 1/[\pi R \sqrt{2.4516316}]$$

$$L_P = (F_H - F_L)/(F_H \cdot F_L) \cdot R \sqrt{2.4516316}/2\pi$$

$$C_P = 1/[2\pi R(F_H - F_L) \sqrt{2.4516316}]$$

where $F_L$ is the low crossover frequency, $F_H$ is the high crossover frequency, and R is the value of impedance characteristic of the transmission line. K must equal 0.34444.

Figure 5:
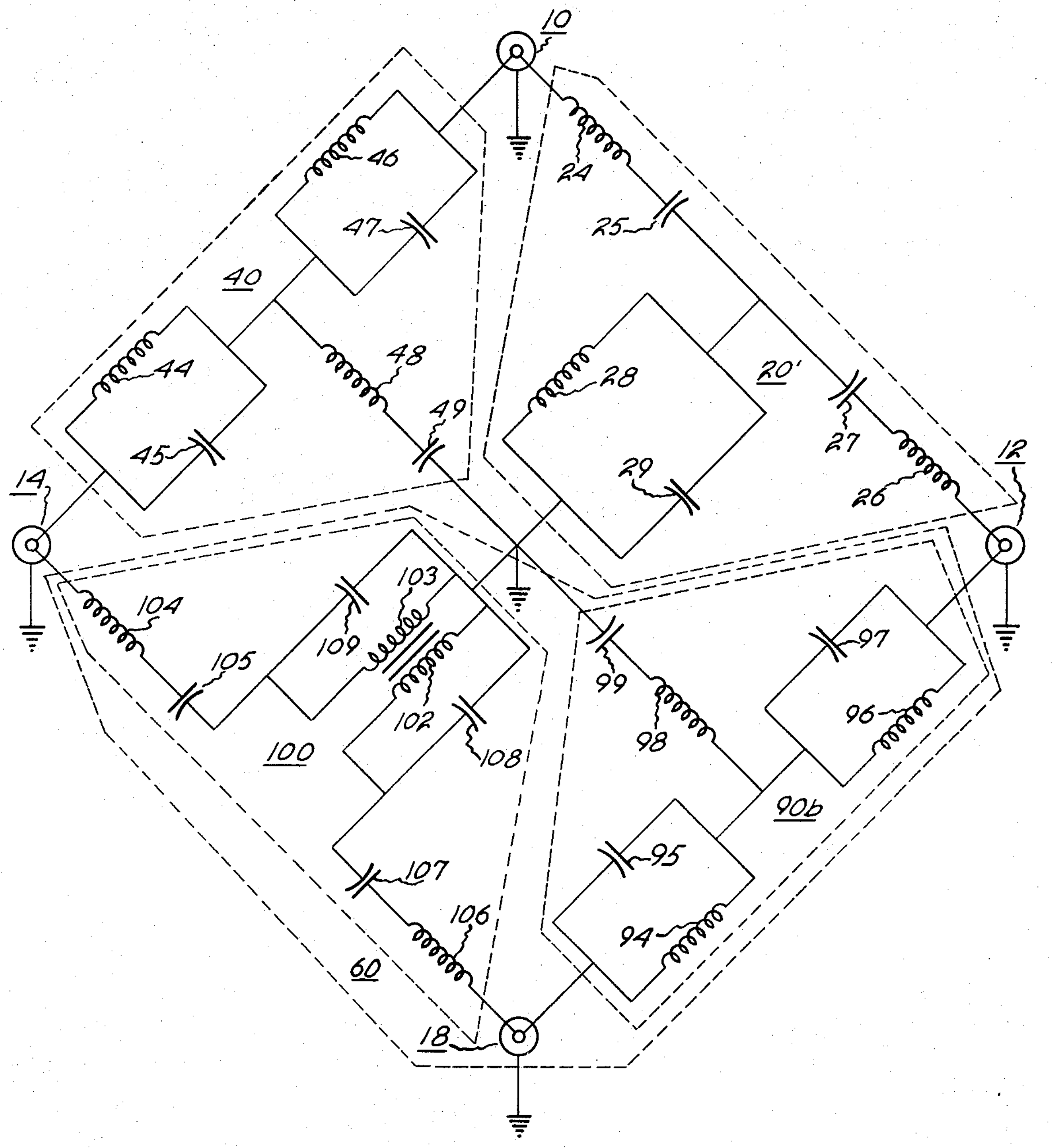
FIGS. 5 and 6 are modifications of the filter hybrid band pass-band stop filter of FIG. 3.

Another embodiment of the invention is shown in FIG. 5. There, the complementary filtering and phase inversion means 60 comprises the second band stop filter means 90' electrically connecting the band pass port 12 and the second common port 18, and a means for band pass filtering and phase inverting 100 electrically connecting the band stop port 14 and the second common port 18.

The means for band pass filtering and phase inverting comprises one series branch formed by an inductor 104 and a capacitor 105 connected in series and another series branch formed by an inductor 106 and capacitor 107 connected in series. The means for band pass filtering and phase inverting 100 further comprises an intermediate network electrically connected between the two series branches. The intermediate network includes a center-tapped inductor 101 having a first winding 102 and a second winding 103 wound for phase inversion. The center-tapped inductor should have a coupling coefficient near unity in order to obtain optimum performance. A capacitor 108 connected in parallel with the first winding 102 and a capacitor 109 connected in parallel with the second winding 103 are further included in the intermediate network.

In FIG. 5, the first and second band stop filter means 40' and 90', respectively, each comprise band stop T filters which have the construction and characteristics previously described in conjunction with FIG. 3. The first band pass filter means 20' comprises a band pass T filter which has the same construction and characteristics previously described in conjunction with FIG. 3.

The means for band pass filtering and phase inverting 100 has a band pass frequency response substantially identical to the band pass frequency response of the first band pass filter means 20'. The substantially identical band pass frequency response characteristics result because combination of the elements 101, 102, 103, 108 and 109 in the means 100 is substantially identical in frequency filtering capability to the combination of elements 28 and 29 in the means 20'.

In addition, the means for band pass filtering and phase inverting 100 has a capability for phase inverting undesired frequencies. The first winding 102 and the second winding 103, wound for phase inversion, cause any undesired frequency transmitted through the means for band pass filtering and phase inverting 100 to be phase inverted. Because the phase inversion occurs in the means 100, the necessity for the center-tapped inductor 62 of FIG. 3 is eliminated and a direct circuit connection may be made to the second common port 18.

The means for band pass filtering and phase inverting 100 functions to reduce or cancel the effect of undesired frequencies in the same manner as was previously described in conjunction with FIGS. 1 and 3. The input impedance of the hybrid band pass-band stop filter of FIG. 5 is constant at all frequencies if the same critical values of the circuit elements described in conjunction with FIG. 3 are employed for those circuit elements having the same reference numerals as in FIG. 3 and if the other requirements described in conjunction with FIG. 3 are met. The values of inductors 104 and 106 must be the same as the values of inductors 24 and 26, and the values of capacitors 105 and 107 must be the same as the values of capacitors 25 and 27. The first and second windings 102 and 103, respectively, must have a shunt inductance of value $KL_P$ and capacitors 108 and 109 must each have value of $C_P/2K$, where K, $L_P$, and $C_P$ have the values described in conjunction with FIG. 3.

Figure 6:
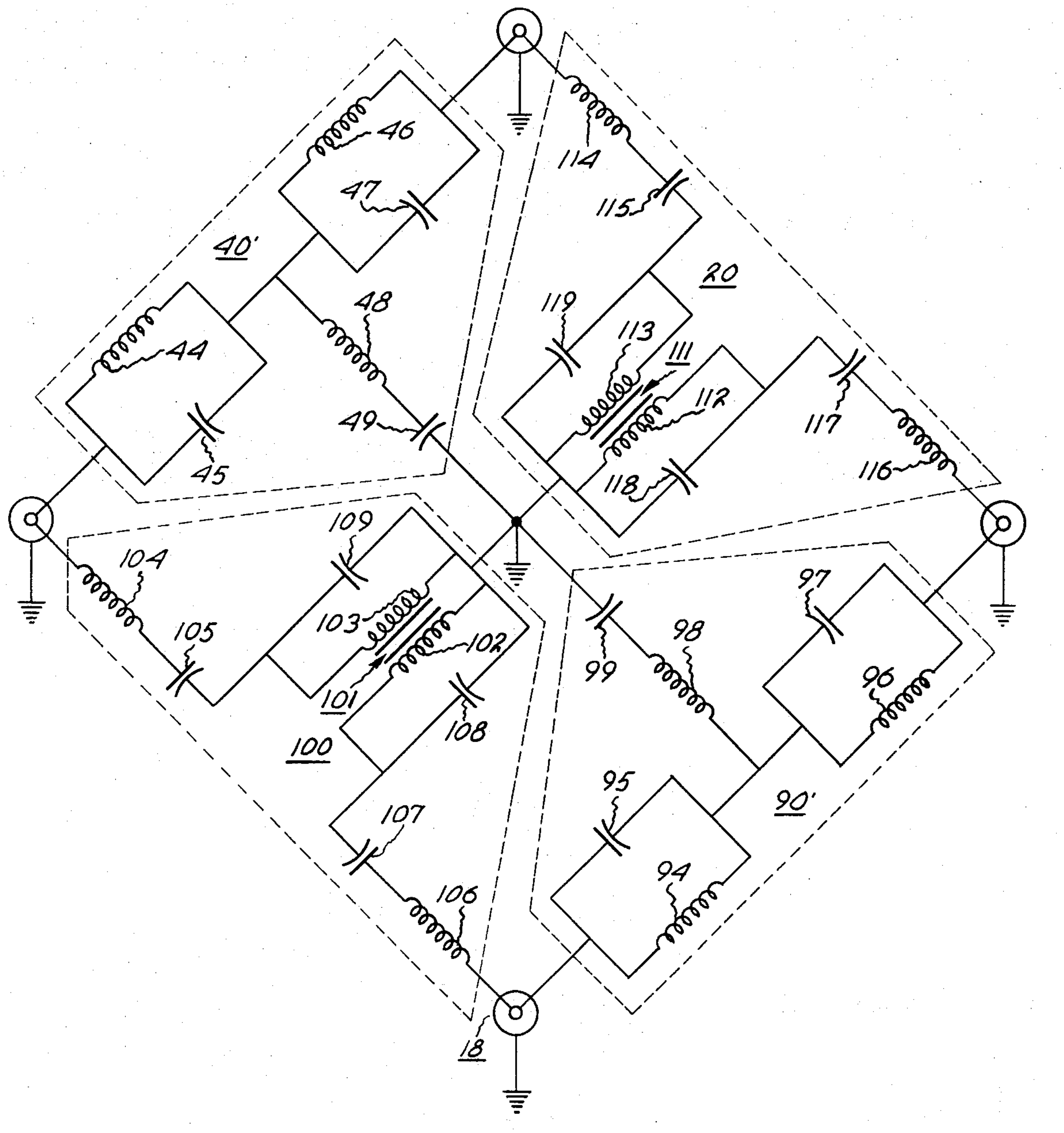

A modification of the hybrid band pass-band stop filter of FIG. 5 is shown in FIG. 6. In FIG. 6, the first band pass filter means 20'' comprises two series branches and an intermediate network electrically connected between the two series branches. One series branch is formed by an inductor 114 and capacitor 115 connected in series and the other series branch is formed by an inductor 116 and capacitor 117 connected in series. The intermediate network of the first band pass filter means 20'' includes a transformer 111 which has a coupling coefficient substantially identical to the coupling coefficient of the center-tapped inductor 101, although the coupling coefficient requirement of the circuit of FIG. 6 may be relaxed slightly from the stringent near-unity requirement of FIG. 5 without sacrificing optimum performance. The transformer 111 has a first winding 112 and a second winding 113 which are wound for in-phase signal transmission so that signals are transmitted by the center-tapped inductor 111 without phase alteration. A capacitor 118 is connected in parallel with the first winding 112 and a capacitor 119 is connected in parallel with the second winding 113.

The band pass frequency response characteristic of the first band pass filter means 20'' is substantially identical to the band pass frequency response characteristic of the means for band pass filtering and phase inverting 100. This results because the coupling coefficients of the center-tapped inductor 101 and transformer 111 are substantially identical and because the values of the corresponding circuit elements in the means 20'' and 100 are the same. Inductors 114 and 116 have the same value as the inductors 104 and 106. Capacitors 115 and 117 have the same value as capacitors 105 and 107. The value of the shunt inductance of the windings 112 and 113 is the same as the value of the shunt inductance of the windings 102 and 103. The value of capacitors 118 and 119 is the same as the value of the capacitors 108 and 109. The values of circuit elements of means 40' and 90' are the same as the values of the corresponding elements described in conjunction with FIG. 5. The values of the circuit elements of FIG. 6 provide that the hybrid band pass-band stop filter has a constant input impedance at all frequencies, providing the requirements described in conjunction with FIG. 5 are met.

The operation of the hybrid band pass-band stop filter of FIG. 6 is the same as the operation of the hybrid band pass-band stop filter of FIG. 5, and secures the advantages provided by the other embodiments of the invention. In addition, the circuit of FIG. 6 allows relaxation of the coupling coefficient requirements of the circuit of FIG. 5 while still insuring optimum performance of the hybrid band pass-band stop filter.

Although a number of embodiments of the hybrid band pass-band stop filter have been shown and described, those skilled in the art will perceive changes and modifications without departing from the invention. For example, there are well-known methods for constructing filters equivalent to those disclosed, such as the substitution of $\pi$ filters for T filters. Therefore, it is intended by the appended claims to cover all such changes and modifications as fall within the true spirit and scope of the invention.

What is claimed as new and desired to be secured by Letters Patent of the United States is:

1. A hybrid filter comprising:

a. a first common port;

b. a band pass port;

c. a band stop port;

d. first band pass filter means electrically connecting said first common port and said band pass port,
said first band pass filter means having a band pass frequency response for transmitting a range of frequencies from a low crossover frequency substantially greater than zero frequency to a high crossover frequency;

e. first band stop filter means electrically connecting said first common port and said band stop port,
said first band stop filter means having a band rejection frequency response for transmitting all frequencies except the range of frequencies transmitted by said first band pass filter means; and f. complementary filtering and phase inversion means electrically connecting said band pass port and said band stop port,
said complementary filtering and phase inversion means providing cancellation of the effect of undesired frequencies.

2. The hybrid filter as recited in claim 1, wherein said complementary filtering and phase inversion means comprises:

a. a second band pass filter means having a band pass frequency response substantially identical to the band pass frequency response of said first band pass filter means;

b. a second band stop filter means having a band rejection frequency response substantially identical to the band rejection frequency response of said first band stop filter means; and c. means electrically connected between said second band pass filter means and second band stop filter means for phase inverting frequencies, said last-named means including a series circuit in which said second band pass filter means is electrically connected to said band stop port and said second band stop filter means is electrically connected to said band pass port.

3. The hybrid filter as recited in claim 2 wherein said means for phase inverting frequencies comprises a center-tapped inductor.

4. The hybrid filter as recited in claim 3, further including:

a. a second common port; and b. said center-tapped inductor further including a magnetically coupled secondary winding electrically connected to said second common port.

5. The hybrid filter as recited in claim 2 wherein:

a. said first and second band pass filter means each include a capacitor and an inductor connected in series; and b. said first and second band stop filter means each include a capacitor and an inductor connected in parallel.

6. The hybrid filter as recited in claim 5 wherein:

a. the inductors and capacitors of said first and second band pass filter means have values of $L_S$ and $C_S$, respectively; and
b. the inductors and capacitors of said first and second band stop filter means have values of $L_P$ and $C_P$, respectively; where $$L_S=[R\sqrt{2}]/[2\pi(F_H-F_L)]$$
$$C_S=(F_H-F_L)/(F_H\cdot F_L)\cdot 1/[2\pi R\sqrt{2}]$$
$$L_P=(F_H-F_L)/(F_H\cdot F_L)\cdot(R\sqrt{2})/(2\pi)$$
$$C_P=1/[2\pi R\sqrt{2}(F_H-F_L)]$$

R is a value of impedance characteristic of a transmission line to which the hybrid filter is adapted to be connected, $F_L$ is the low crossover frequency, and $F_H$ is the high crossover frequency.

7. The hybrid filter as recited in claim 2 wherein:
a. said first and second band pass filter means comprise first and second band pass T filters, respectively, each band pass T filter having two series branches and a shunt branch; and
b. said first and second band stop filter means comprise first and second band stop T filters, respectively, each band stop T filter having two series branches and a shunt branch.

8. The hybrid filter as recited in claim 7 wherein:
a. each series branch of said first and second band pass T filter comprises an inductor of value $L_S$ and a capacitor of value $C_S$ connected in series;
b. each shunt branch of said first and second band pass T filters comprises an inductor of value $KL_P$ and a capacitor of value $C_P/K$ connected in parallel;
c. each series branch of said first and second band stop T filters comprises an inductor of value $L_P$ and a capacitor of value $C_P$ connected in parallel; and
d. each shunt branch of said first and second band stop T filters comprises an inductor of value $KL_S$ and a capacitor of value $C_S/K$ connected in series; where K equals 0.34444, $$L_S=[R\sqrt{2.4516316}]/[2\pi(F_H-F_L)]$$
$$C_S=(F_H-F_L)/(F_H\cdot F_L)\cdot 1/[2\pi R\sqrt{2.4516316}$$
$$L_P=(F_H-F_L)/(F_H\cdot F_L)\cdot(R\sqrt{2.4516316}/(2\pi)$$
$$C_P=1/[2\pi R(F_H-F_L)\sqrt{2.4516316}]$$

R is a value of impedance characteristic of a transmission line to which the hybrid filter is adapted to be connected, $F_L$ is the low crossover frequency, and $F_H$ is the high crossover frequency.

9. The hybrid filter as recited in claim 1 wherein said complementary filtering and phase inversion means comprises:
a. a second common port;
b. a second band stop filter means electrically connecting said band pass port and said second common port, said second band stop filter means having a band rejection frequency response substantially identical to the band rejection frequency response of said first band stop filter means; and
c. means for band pass filtering and phase inverting which electrically connects said band stop port and second common port, said means for band pass filtering and phase inverting having a band pass frequency response substantially identical to the band pass frequency response of said first band pass filter means and further having the capability of phase inverting undesired frequencies.

10. The hybrid filter as recited in claim 9 wherein said first and second band stop filter means comprise first and second band stop T filters, each band stop T filter having two series branches and a shunt branch.

11. The hybrid filter as recited in claim 10 wherein said first band pass filter means comprises a first band pass T filter having two series branches and a shunt branch.

12. The hybrid filter as recited in claim 11 wherein said means for band pass filtering and phase inverting comprises:
a. two series branches; and
b. an intermediate network electrically connected between the two series branches;
the intermediate network including a center-tapped inductor having first and second windings wound for phase inversion.

13. The hybrid filter as recited in claim 12 wherein:
a. each series branch of said first and second band stop T filters comprises an inductor of value $L_P$ and a capacitor of value $C_P$ connected in parallel;
b. each shunt branch of said first and second band stop T filters comprises an inductor of value $KL_S$ and a capacitor of value $C_S/K$ connected in series;
c. each series branch of said first band pass T filter comprises an inductor of value $L_S$ and a capacitor of value $C_S$ connected in series;
d. the shunt branch of said first band pass T filter comprises an inductor of value $KL_P$ and a capacitor of value $C_P/K$ connected in parallel;
e. each series branch of said means for band pass filtering and phase inverting comprises an inductor of value $L_S$ and a capacitor of value $C_S$ connected in series; and
f. the intermediate network of said means for band pass filtering and phase inverting further includes two capacitors of value $C_P/2K$, one capacitor being connected in parallel with the first winding and the other capacitor being connected in parallel with the second winding,
the first and second winding having a shunt inductance of value $KL_P$;
where K equals 0.34444, $$L_S=[R\sqrt{2.4516316}]/[2\pi(F_H-F_L)]$$
$$C_S=(F_H-F_L)/(F_H\cdot F_L)\cdot 1/[2\pi R\sqrt{2.4516316}]$$
$$L_P=(F_H-F_L)/(F_H\cdot F_L)\cdot[R\sqrt{2.4516316}]]/[2\pi]$$
$$C_P=1/[2\pi R(F_H-F_L)\sqrt{2.4516316}]$$

R is a value of impedance characteristic of a transmission line to which the hybrid filter is adapted to be connected,
$F_L$ is the low crossover frequency, and $F_H$ is the high crossover frequency.

14. The hybrid filter as recited in claim 10 where said first band pass filter means and said means for band pass filtering and phase inverting each comprise:
a. two series branches; and
b. an intermediate network electrically connected between the two series branches,
the intermediate network of said first band pass filter means including a center-tapped inductor having first and second windings wound for in-phase signal transmission, and further having a predetermined coupling coefficient, and the intermediate network of said means for filtering and phase inverting including a center-tapped inductor having first and second windings wound for phase inversion, and further having a coupling coefficient substantially identical to the coupling coefficient of the center-tapped inductor of said first band pass filter means.

15. The hybrid filter as recited in claim 14 wherein:

a. each series branch of said first and second band stop T filters comprises an inductor of value $L_P$ and a capacitor of value $C_P$ connected in parallel;

b. each shunt branch of said first and second band stop T filters comprises an inductor of value $KL_S$ and a capacitor of value $C_S/K$ connected in series;

c. each series branch of said first band pass filter means and of said means for band pass filtering and phase inverting comprises an inductor of value $L_S$ and a capacitor of value $C_S$ connected in series;

d. each intermediate network of said first band pass filter means and said means for band pass filtering and phase inverting further includes two capacitors of value $C_P/2K$, one capacitor being connected in parallel with the first winding of each center-tapped inductor and the other capacitor being connected in parallel with the second winding of each center-tapped inductor, the first and second windings of both center-tapped inductors having a shunt inductance of value $KL_P$;

where K equals 0.34444

$$L_S = [R\ \sqrt{2.4516316}]/[2\pi\ (F_H - F_L)]$$

$$C_S = (F_H - F_L)/(F_H \cdot F_L) \cdot 1/[2\pi\ R\ \sqrt{2.4516316}]$$

$$L_P = (F_H \cdot F_L)/(F_H \cdot F_L) \cdot (R\ \sqrt{2.4516316})/(2\pi)$$

$$C_P = 1\ /[2\pi R\ (F_H - F_L)\ \sqrt{2.4516316}]$$

R is the value of impedance characteristic of a transmission line to which the hybrid filter is adapted to be connected, $F_L$ is the low crossover frequency, and $F_H$ is the high crossover frequency.

* * * * *